Figure 1:
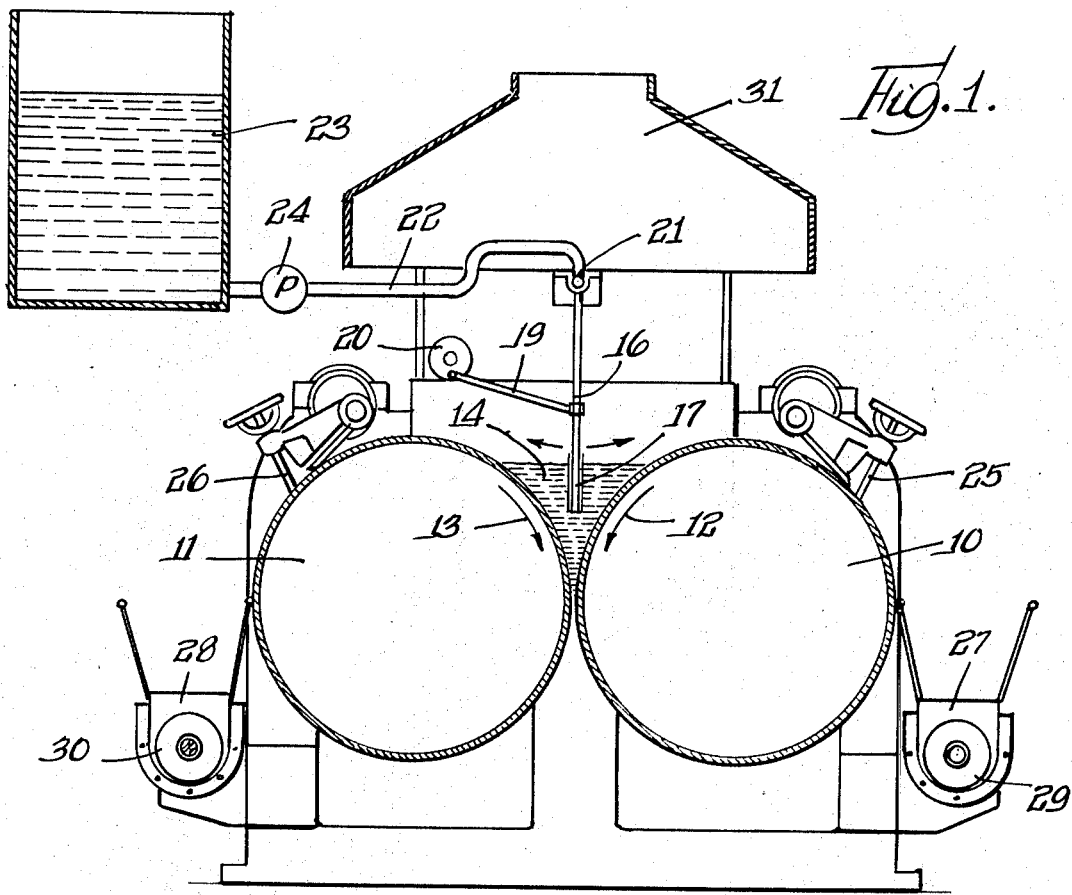

United States Patent
Schmitt et al.

[15] 3,653,922
[45] Apr. 4, 1972

[54] METHOD OF PREPARING A LOW CALORIE PULVERULENT OR GRANULAR SWEETENING COMPOSITION

[72] Inventors: William H. Schmitt, Elmhurst; Robert A. Lukey, Northbrook, both of Ill.

[73] Assignee: Alberto-Culver Company, Melrose Park, Ill.

[22] Filed: Feb. 12, 1968

[21] Appl. No.: 704,792

[52] U.S. Cl. ................................99/141 A, 34/113, 159/11
[51] Int. Cl. .................................................A23l 1/26
[58] Field of Search ......................99/141, 141 A; 159/7–11; 127/34; 34/108, 113, 127

[56] References Cited

UNITED STATES PATENTS

| | | | |
|---|---|---|---|
| 3,320,074 | 5/1967 | Gebhardt | 99/141 |
| 3,325,296 | 6/1967 | Braaten | 99/141 |
| 3,363,665 | 1/1968 | Daane et al. | 159/10 |

*Primary Examiner*—Raymond N. Jones
*Assistant Examiner*—Roger B. Andewelt
*Attorney*—Wallenstein, Spangenberg, Hattis & Strampel

[57] ABSTRACT

Pulverulent or granular free-flowing water-soluble low calorie sweetening compositions having the general appearance of sucrose are prepared by subjecting an aqueous composition or solution containing from 60 to 80 percent solids in the form of a distinctly major proportion of a water-soluble starch hydrolysate having a dextrose equivalent in the range up to 25 and a small amount of an essentially noncaloric artificial sweetener to drying under atmospheric conditions on a double drum dryer under controlled conditions.

11 Claims, 4 Drawing Figures

Patented April 4, 1972

3,653,922

2 Sheets-Sheet 1

Inventors
William H. Schmitt
Robert A. Lukey
By: Wallenstein, Spangenburg, Hattis & Strampel
Attys.

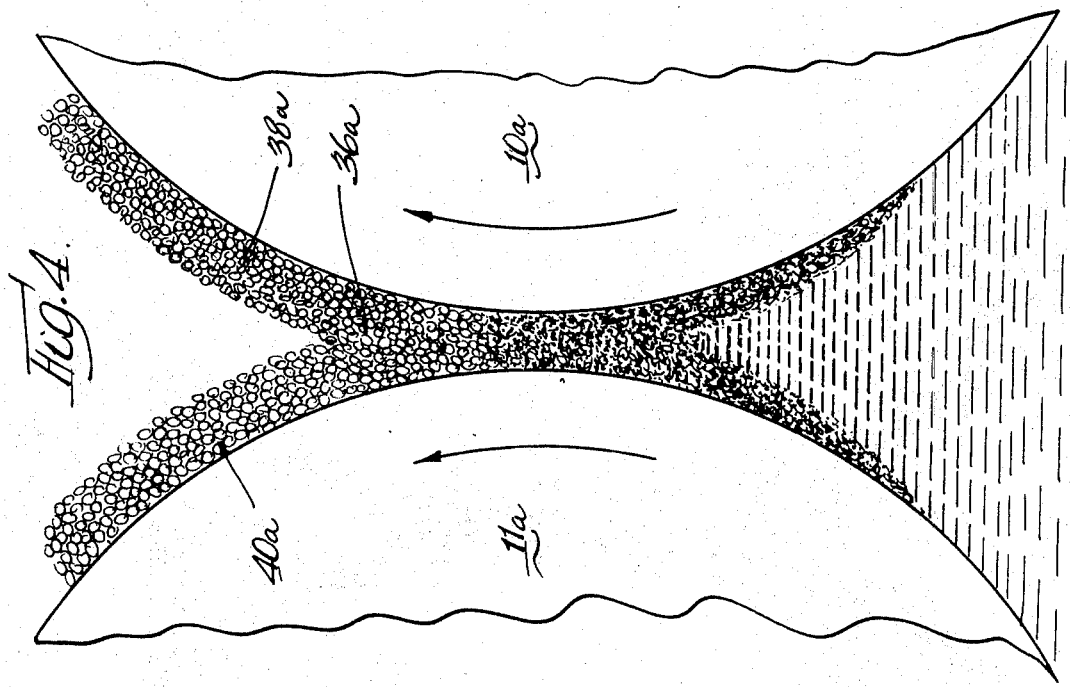
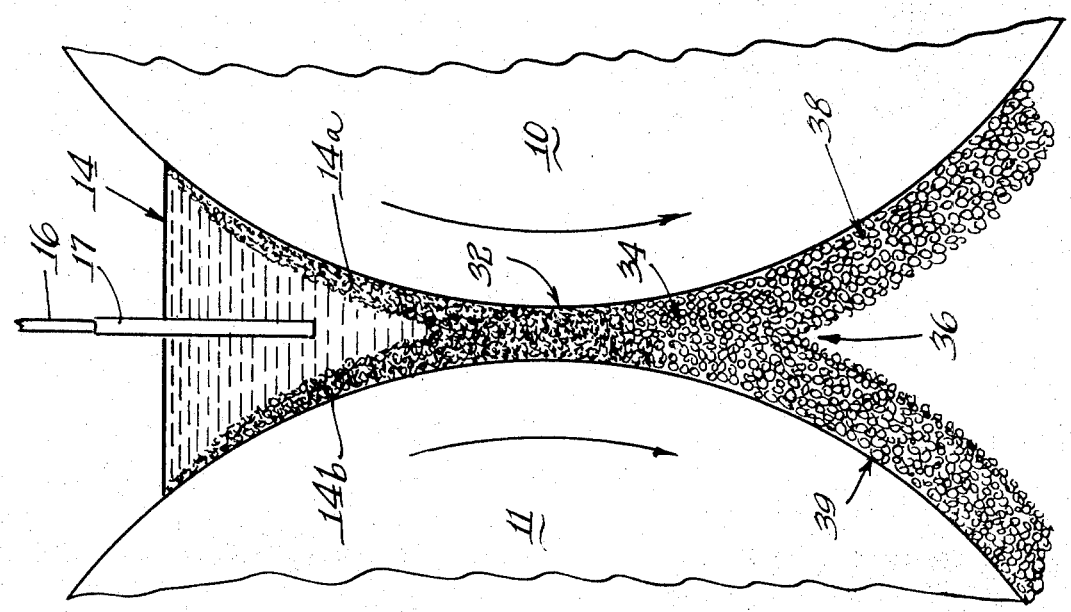

METHOD OF PREPARING A LOW CALORIE PULVERULENT OR GRANULAR SWEETENING COMPOSITION

Our invention relates to the production of pulverulent or granular free-flowing water-soluble low calorie sweetening compositions having the general appearance of sucrose and which can be used, and are intended for use, in the same general way as sucrose for sweetening beverages and for various other food purposes for which sucrose is utilized.

Numerous approaches have been made to the production of sucrose substitutes which have the bulk and general appearance of sucrose as, for instance, those of ordinary granulated sugar, but which are characterized by a caloric content very substantially less than that of sucrose. Various of such earlier approaches are discussed in U.S. Pat. Nos. 3,320,074 and 3,325,296. In addition, these patents describe certain procedures of their own for the production of sucrose substitutes. Thus, in the first of these two patents, an aqueous solution of a water-soluble dextrin, having a dextrose equivalent of about zero, is subjected to pressure, aerated and then spray dried, the final product having a bulk density not exceeding about 0.15 g./cc. and having a caloric content in the range of about 2.7 to less than 5.5 calories per level teaspoon. In the second of said patents, an aqueous solution of a water-soluble starch hydrolysate, having a dextrose equivalent in excess of 13 but not more than 28, and a noncaloric artificial sweetener is subjected to vacuum drying as, for instance, on a vacuum drum dryer. The resulting products, after milling and classification, have caloric contents as low as about 3 calories per level teaspoon.

Sweetening compositions of the type disclosed in U.S. Pat. No. 3,320,074, prepared as they are by a spray drying operation, tend to have an undesirable chalky look and feel and are readily distinguishable from sucrose. On the other hand, while sweetening compositions of the type disclosed in the aforementioned U.S. Pat. No. 3,325,296 bear a reasonably good resemblance to sucrose and have been and are being commercially marketed, their method of manufacture, requiring as it does, a vacuum drying procedure, notably the utilization of vacuum drum drying equipment, involves very substantial costs in such equipment, the drying operations are cumbersome and the economics of the drying operation leave much to be desired. Furthermore, commercially marketed sweetening compositions purporting to be made by the vacuum drying procedure of U.S. Pat. No. 3,325,296 generally have bulk densities of 0.18 to 0.19 g./cc. and a caloric content of not less than 3 calories per level teaspoon. As reported in said patent, bulk densities in the range of about 43 to 78 percent of that of sucrose are obtained. In this connection, it may be noted that sucrose, in the form of ordinary granulated sugar, has bulk density of about 0.9 g./cc. (which is 4.5 g. per level teaspoon of about 5 cc.).

In accordance with our invention, pulverulent or granular free-flowing, water-soluble, low calorie sweetening compositions having the general appearance of sucrose, as, for instance, that of ordinary granulated sugar, are produced, without aeration and without resort to vacuum drying, in a form having exceptionally low bulk densities and exceptionally low caloric contents per level teaspoon. Thus, by following the teachings and principles of our invention, sweetening compositions of the foregoing character are obtainable with bulk densities in the range of 0.05 to 0.15 g./cc., particularly 0.09 to 0.12 g./cc., and especially about 0.11 g./cc., and caloric contents well below 3 calories per level teaspoon, commonly from about 1 or 1½ to 2 calories per level teaspoon.

We have discovered that the foregoing results are obtained throught the utilization, in combination, of certain ingredients in certain ranges of proportions, coupled with a drying operation which is carried out in a certain manner at atmospheric pressure and under certain controlled conditions, all as is described in detail below.

We first make up an aqueous composition or solution containing, as essential ingredients, and advantageously the only ingredients, in addition to the water, a certain type of water-soluble starch hydrolysate and an essentially noncaloric artificial sweetener, the total solids in said aqueous composition or solution ranging from about 60 to 80 percent, by weight, preferably 72 to 78 percent and, optimumly, about 76 percent. The starch hydrolysate constitutes a distinctly major proportion and the essentially noncaloric artificial sweetener constitutes a distinctly minor proportion of the aqueous composition or solution and, of course, of the total solids and of the final sweetening composition. The proportions of noncaloric artificial sweetener utilized, although always distinctly minor, are variable, depending upon the sweetness characteristics of the noncaloric artificial sweetener utilized, and on the degree of sweetness desired in the final sweetening composition. In general, the noncaloric artificial sweetener will usually fall within the range of about 3 to 15 percent, by weight, of the starch hydrolysate. The viscosities of the aforesaid aqueous compositions or solutions, as fed into the pool thereof prior to being picked up by the dryer drums, as described hereafter, are variable, falling into the range of 100 to 100,000 cps. as measured by a Brookfield Viscosimeter. The viscosities depend, of course, not only on the concentration of the solids in the aqueous composition or solution, for a particular starch hydrolysate and a particular noncaloric artificial sweetener, but also on the temperature of such aqueous composition or solution. Thus, in an illustrative case of an aqueous composition or solution containing 76 percent total solids, in which, on the total solids basis, the starch hydrolysate constitutes 91 percent and the essentially noncaloric artificial sweetener constitutes 9 percent, the viscosity is about 25,000 cps. at 37° C., about 11,200 cps. at 50° C., and about 8,800 cps. at 55° C.

The water-soluble starch hydrolysates, usually corn starch hydrolysates, are, per se, well known to the art and are generally referred to in the aforementioned U.S. Pat. No. 3,325,296. However, whereas said patent points out that it is necessary to use starch hydrolysates which have a dextrose equivalent (D.E.) in excess of 13 but not more than 28, it has been found that starch hydrolysates having a dextrose equivalent in excess of 25 produce finished dried sweeteners which are far too hygroscopic to be packaged and handled satisfactorily. Furthermore, it has also been found that dried sweetener compositions can be prepared from starch hydrolysates which have dextrose equivalents which are of the order of about zero. Hence, those water-soluble starch hydrolysates which are useful for the production of the sweetener compositions of our invention are those which have dextrose equivalents in the range up to 25, particularly desirably in the range of 6 to 15.

The essentially noncaloric artificial sweeteners which we utilize are, per se, well known to the art and are shown, for instance, in the aforementioned patents. Most commonly, they are cyclamates and saccharin or mixtures thereof, generally in the form of salts such as the sodium, potassium, calcium and magnesium salts or other innocuous or pharmacologically acceptable salts.

Figure 2:
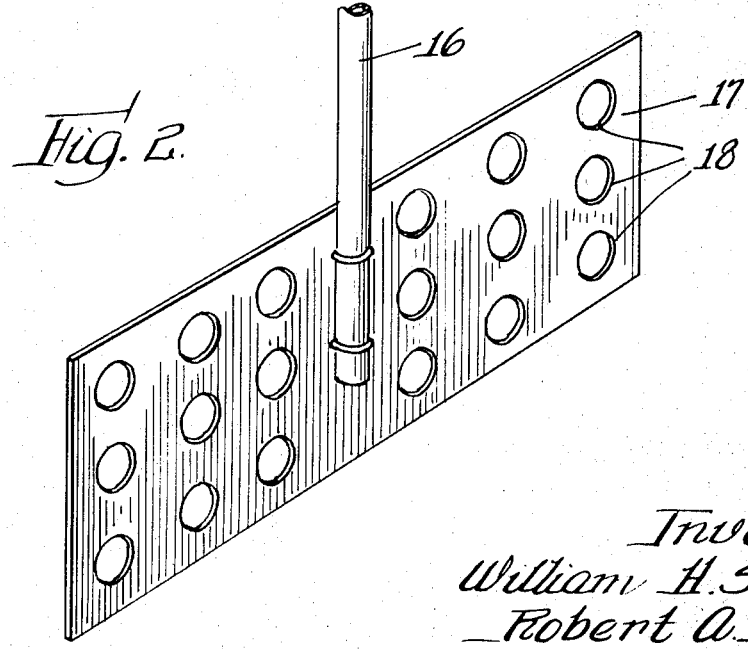

The accompanying drawings show illustrative forms of a double drum drying apparatus set up, operating at atmospheric pressure, in which the drying of the above-described aqueous compositions or solutions of the starch hydrolysate and essentially noncaloric artificial sweetener can be carried out in accordance with our invention, and wherein FIG. 1 is a schematic view of the drying apparatus;

FIG. 2 is an enlarged view, in perspective, of the feed pipe and associated agitator vane utilized in the drying apparatus of FIG. 1;

FIG. 3 is an enlarged vertical sectional view showing, in exaggerated or distorted form, for illustrative purposes, the nature of the changes which occur in the aqueous starch hydrolysate-essentially essentially noncaloric artificial sweetener composition or solution during the drying as the drums rotate toward each other in the equipment setup shown in FIG. 1; and FIG. 4 is a view similar to that of FIG. 3 but where the cylindrical drying drums are supported for rotation away from each other and where the feed of the aqueous hydrolysate-essentially noncaloric artificial sweetener composition or solution is from the bottom.

As shown illustratively and schematically in FIG. 1 of the accompanying drawings, said dryer advantageously comprises a pair of internally steam heated cylindrical drums 10 and 11 suitably supported for rotation towards each other as indicated by arrows 12 and 13. A pool 14 of the aqueous starch hydrolysate-essentially noncaloric artificial sweetener composition is maintained in the crease or space between the drums 10 and 11 and said pool is maintained by feeding thereinto, from the feed pipe 16, or by any other suitable means, preferably continuously, additional quantities of said aqueous composition. The feed pipe 16 preferably dips into the pool and, as shown more particularly in FIG. 2, is attached to an agitator vane 17 having a plurality of perforations 18 therein, the feed pipe 17-agitator vane 18 assembly being adapted to be oscillated or moved in the pool by any suitable means, as, for instance, as indicated in FIG. 1, by a link 19 connected to the feed pipe 16 and operated by an eccentric 20 so as to perform the additional function of agitating or mixing the aqueous composition sufficiently to inhibit formation of a "skin" on the surface of said aqueous composition and/or to break such "skin" as may form or tend to be formed. While the foregoing arrangement for effecting agitation or mixing to inhibit "skin" formation and/or to break "skin" formation which may occur is desirable, it will be understood that any other suitable means of obtaining agitation or mixing effective for achieving the stated function can be utilized. The inhibition of "skin" formation and/or the breaking of "skin" formation is particularly advantageous since it brings about increased production or rates of production of the finished dried low calorie sweetening composition over what results where such "skin" inhibition or breaking is not effected. The feed pipe 16 communicates with a pendulum feed structure 21 which, in turn, is fed through a flexible supply tube 22 from a reservoir 23, containing the aqueous composition or solution to be dried, by means of a pump 24.

The thin films of the aqueous composition which are picked up as a coating by each of the drums 10 and 11 become confluent in the pinch between said drums and the resulting confluent bead is pulled apart by reason of the motion of the counter-rotating drums in their normal paths. This forms a disrupted hot film on each drum which is carried along and the water evaporated therefrom, thereby producing a dried film which is removed by the scrapers or doctor knives 25 and 26 which ride on the respective drums 10 and 11. The dried sweetener composition is removed from the drums by said scrapers or doctor knives 25 and 26 in the general form of flakes having a moisture content which can be controlled within desired limits but is preferably in the range of about 1 to 4 percent. The dried flakes fall into troughs 27 and 28 and are conveyed therethrough by suitable screw conveyors or the like 29 and 30 and discharged into a mill or grinder (not shown) where the dried flakes are milled or ground to a desired particle size, preferably granules of a size of the order of ordinary granulated sugar. A conventional vapor hood 31 is provided to remove the vapors from the drying operation.

Referring, now, to FIG. 3, it may first be pointed out that the liquid level of the pool 14 is in constant agitation from the movement of the agitator vane 17 and from the boiling action caused by vaporization of the solution which is heated by the drums 10 and 11. The solution tends to start to dry in a somewhat V-shaped area shown above the center line of the closest proximity (the pinch) between the two drums. As the partially dried composition 14a and 14b approaches the midpoint 32, the temperature of the solution increases to maximum due to the proximity of the drums 10 and 11 (the gap dimension in the range of 0.008 to 0.012 inch and more particularly at approximately 0.010 inch). There is then substantially no temperature gradient and the temperature is at or above that required for drying. As the material gets into approximately the area 34, cellular structure is being formed and it is aided by the tearing action, at 36, caused by the adherence of the film to the drum surfaces 38, 39. The tearing action at 36 causes a mechanical pulling of the partially expanded cellular material radially outwardly from the drums, discouraging the formation of any film and encouraging the exposure and expansion of the cellular material.

Referring, now, to FIG. 4, where the drums are rotated in opposite directions and where the aqueous composition is applied to the drum surfaces from the bottom, the composition is applied to drums 10a and 11a by suitable pans, applicator rolls, spray, or other means not shown. The disruption of the partially dried cellular material at 36a results from the fact that the cellular material at 38a and 40a adheres to the adjacent drums. It may be noted that the finished dried products obtained by the practice of the embodiment shown in FIG. 4 generally do not give quite as low bulk densities as in the case of the practice of the invention of the embodiment of FIG. 3, although the bulk densities obtained in the FIG. 4 embodiment are substantially lower than are obtained on a single drum dryer or by vacuum drum drying techniques.

In order to obtain the full benefits of our invention, it is important that there be a mechanical tearing action as shown at 36 and at 36a concomitant with the simultaneous application of heat. While this is best achieved by means of a double drum dryer arrangement, it can also be accomplished by other means as, for instance, by a belt drying arrangement modified to bring about a compression of the dried film and the tearing or disrupting thereof in a drying environment in which the starch hydrolysate-substantially noncaloric artificial sweetener aqueous composition is applied to a drying surface so as to cause a substantially uniform temperature throughout the material being dried, such temperature being equal to or above that required to effect drying and providing a means for mechanically disrupting the interior of the drying material.

The bulk density of the finished dried sweetener compositions is affected primarily by the concentration of solids in the aqueous starch hydrolysate-essentially noncaloric artificial sweetener composition to be dried, the manner in which the drying is carried out, the temperature of drying, and the speed of the drying drums.

As we have pointed out above, in the practice of our invention, the solids concentration of the aqueous composition to be dried, in its broadest aspects, should fall within the range of 60 to 80 percent. The lower solids concentrations, in the aforesaid range, produce finished dried sweetener compositions having lower bulk densities than those obtained with the higher solids concentrations. However, even with solids concentrations of about 76 percent in the aqueous compositions to be dried, we commonly obtain finished dried sweetener compositions with a bulk density of the order of 0.11 g./cc., and with caloric contents of the order of 1½ calories per level teaspoon.

It has been found the drums should be heated and maintained at a temperature in the range of about 120° to 180° C. or, in terms of steam pressure, in the range of about 20 to 125 p.s.i.g., especially satisfactory being steam pressures corresponding to a temperature in the range of 160° to 170° C. Drum speeds are variable, broadly falling within the range of 0.5 to 25 r.p.m., but usually being in the range of 8 to 20 r.p.m. The drums are spaced apart, at their closest line of contact along their longitudinally extending surfaces, of from about 0.002 to 0.02 inch, advantageously from 0.008 to 0.012 inch.

We have found, surprisingly, that, when aqueous compositions satisfying the foregoing requirements, are subjected to drying at atmospheric pressure under the conditions described above, the resulting dried sweetener compositions, after milling or grinding the dried compositions as removed from the drums or other drying surface to produce a generally uniform pulverulent or granular composition, have bulk densities very distinctly less than are obtained in a vacuum single drum dryer or in a single drum dryer operating at atmospheric pressure, where the solids concentrations in the aqueous compositions to be dried, the drying temperatures and the drum speeds are the same. Thus, for instance, when aqueous compositions or solutions containing a distinctly major proportion of a starch hydrolysate of the general type shown in U.S. Pat. No. 3,235,296 and a distinctly minor proportion of an essentially noncaloric artificial sweetener, having a solids content of, say 80 percent, are dried on a single drum dryer operating at atmospheric pressure, and the resulting dried composition as removed from the dryer is then milled or ground to a pulverulent or granular composition similar to ordinary granulated sugar, the bulk density of such composition is very decidedly greater than the bulk density of such a product when dried on a double drum dryer operating at atmospheric pressure under the conditions which we have described in accordance with our invention; and this is the case even where the same aqueous composition, the same drying temperature, the same drum speed, and the same method of particle reductions are utilized.

Furthermore, as we have stated, we obtain bulk densities, pursuant to the particularly preferred embodiments of our invention, which are of the order of about one-half the bulk densities obtained by the procedures described above using a single drum dryer operating at atmospheric pressure, the bulk density of our particularly preferred dried sweetener compositions being of the order of 0.11 g./cc. and such that a level teaspoon thereof contains only about 1½ calories.

With due regard for what has been stated above in relation to the drying on a single drum dryer operating at atmospheric pressure of aqueous compositions or solutions of starch hydrolysates and essentially noncaloric artificial sweeteners, we may point out that we have found that such drying operations cannot be satisfactorily or effectively carried out where the solids concentrations of the said aqueous compositions or solutions are as low as 60 percent or fall into our particularly preferred range of about 72 to about 76 percent. This is because, among other things, of the relatively low viscosities of such compositions or solutions and their propensity to form a "skin" on the film on, or as applied on, the drying drum, which appears to impede further and substantially complete drying. Indeed, in using single drum dryers operating at atmospheric pressure, additional problems present themselves. Thus, in seeking to handle starch hydrolysate essentially noncaloric artificial sweetener compositions for drying on single drum dryers operating at atmospheric pressure, it appears to be necessary, to avoid "skin" formation or to obtain effective drying, to utilize aqueous compositions containing extremely high concentrations of solids, very substantially in excess of 80 percent, and generally of the order of about 83 to 85 percent. Such concentrations of solids result in aqueous compositions which are essentially non-flowable at room temperatures. In order to handle and pump such compositions, they must be heated to sufficiently elevated temperatures, of the order of 70° C. or more, so that their viscosities are reduced to a point where they are pumpable and flowable in order that they may be coated in a relatively thin film on the drum of the single drum dryer. At such elevated temperatures, great care is required to be exercised to avoid browning and caramelizing of the starch hydrolysates, with resultant discoloration, which can readily take place in very short periods of time. These problems and difficulties are obviated through the practice of our invention In summary, it may be stated that we have not found it to be possible, on an atmospheric single drum dryer, utilizing combinations of varying the speed, the drying temperature, the viscosity of the starch hydrolysate-essentially noncaloric artificial sweetener aqueous compositions, the concentration of solids in said aqueous composition, and the gap between the applicator roll and the drum, to produce low calorie sweetener compositions having the low bulk densities obtainable by the practice of our invention.

It may be pointed out that the specific nature of the starch hydrolysate, in the aqueous compositions thereof with the essentially noncaloric artificial sweeteners, plays a very significant role in the results which are obtained, in relation to the matter of "skin" formation, and in relation to film disruption in the drying process, in combination with the double drum drying or similar drying procedure utilized.

While the nature of the dried sweetener compositions with which our invention deals is believed apparent from the disclosures set forth above, the following are examples of illustrative aqueous compositions or solutions prior to drying the same in the manner and under the conditions hereinabove described. The percentages stated are by weight.

EXAMPLE 1:

|  | % |
| --- | --- |
| Milo Starch hydrolysate (D.E. 11.5) | 72 |
| Calcium cyclamate | 3 |
| Water | 25 |

EXAMPLE 2:

| Corn starch hydrolysate (D.E. 19.5) | 69.75 |
| --- | --- |
| Calcium cyclamate | 4.2 |
| Saccharin | 1.05 |
| Water | 25 |

EXAMPLE 3:

| Corn starch hydrolysate (D.E. 12) | 62 |
| --- | --- |
| Sodium cyclamate | 3 |
| Water 35 | |

EXAMPLE 4:

| Corn starch hydrolysate (D.E. 12) | 64.4 |
| --- | --- |
| Sodium cyclamate | 4.48 |
| Sodium saccharin | 1.12 |
| Water | 30 |

EXAMPLE 5:

| Milo starch hydrolysate (D.E. 11.5) | 69.05 |
| --- | --- |
| Calcium cyclamate | 5.474 |
| Calcium saccharin | 1.37 |
| Potassium sorbate | 0.076 |
| Water | 24 |

As indicated above, our sweetening compositions advantageously contain only the water-soluble starch hydrolysate and the essentially noncaloric artificial sweetener. Supplemental ingredients can be added in small proportions, if desired, to the aqueous compositions prior to drying the same, to obtain special effects as, for example, edible gums, thickeners, stabilizers, surfactants, preservatives, flow conditioners, and the like. When reference is made in the claims to the aqueous compositions consisting essentially of the specified ingredients, it will be understood that this does not exclude the inclusion of small proportions of supplemental ingredients which do not fundamentally change the character of the low calorie sweetener compositions of our invention.

We claim:

1. A method of making a pulverulent or granular free-flowing, water-soluble, low calorie sweetening composition having the general appearance of sucrose, which comprises
   a. forming an aqueous composition consisting essentially of a distinctly major proportion of a water-soluble starch hydrolysate having a dextrose equivalent in the range up to 25, a distinctly minor proportion of a nontoxic essentially noncaloric artificial sweetener, and water, said composition containing from about 60 to 80 percent solids and having a viscosity in the range of 100 to 100,000 cps.,
   b. applying said aqueous composition, at a temperature in the range between about room temperature and about 55° C., in a thin film to a drying surface heated and maintained at a temperature in the range of about 120° and about 180° C.,
   c. effecting drying of said thin film in the form of a generally cellular structure at atmospheric pressure, d. mechanically disrupting the interior of said dried film by a tearing action while said dried film substantially adheres to said heated drying surface, and thereafter e. removing the dried film from said heated drying surface.

2. A method of making a pulverulent or granular free-flowing, water-soluble, low calorie sweetening composition having the general appearance of sucrose, which comprises a. forming an aqueous composition consisting essentially of a distinctly major proportion of a water-soluble starch hydrolysate having a dextrose equivalent in the range up to 25, a distinctly minor proportion of a nontoxic essentially noncaloric artificial sweetener, and water, said composition containing from about 60 to 80 percent solids and having a viscosity in the range of 100 to 100,000 cps., b. applying said aqueous composition, at a temperature in the range between about room temperature and about 55° C., to adjacent surfaces of the oppositely rotating cylinders of an atmospheric double-drum dryer, 1. said drums being heated and maintained at a temperature in the range of about 120° and about 180° C., and the surfaces of said drums being coated with a thin film of said aqueous composition, 2. said thin film being dried at atmospheric pressure as the drums rotate less than 1 revolution after being coated with the thin film of said aqueous composition, and c. removing the dried film from each of said drums.

3. The method of claim 2, in which said aqueous composition is formed into a liquid pool in the space between and in contact with adjacent surfaces of the oppositely rotating cylinders of said double drum dryer, said aqueous composition being fed from said pool to said drums.

4. The method of claim 3, in which the solids content of the aqueous composition is from 72 to 78 percent.

5. The method of claim 4, in which the solids content is about 76 percent.

6. The method of claim 4, in which conditions of sufficient agitation are provided in said pool effectively to inhibit formation of a skin on the surface of the aqueous composition in said pool and/or to break such skin as may be formed.

7. The method of claim 4, in which the drums are maintained at a temperature in the range of about 150° to 175° C.

8. The method of claim 7, in which the space between the drums is in the range of 0.008 to 0.012 inch.

9. The method of claim 2, in which the dried film is ground to pulverulent or granular form.

10. The method of claim 2, in which the pulverulent or granular sweetening composition has a bulk density in the range of 0.05 to 0.15 g./cc. and has a caloric content of not more than 2 calories per level teaspoon.

11. The method of claim 10, in which the bulk density is not more than 0.11 g./cc. and the caloric content is not more than 1.5 calories per level teaspoon.

* * * * *